United States Patent [19]

Schlunke et al.

[11] Patent Number: 4,825,828
[45] Date of Patent: May 2, 1989

[54] DIRECT FUEL INJECTION

[75] Inventors: Christopher K. Schlunke; Peter W. Ragg, both of Western Australia, Australia

[73] Assignee: Orbital Engine Company Proprietary Limited, Western Australia, Australia

[21] Appl. No.: 253,424

[22] Filed: Sep. 22, 1988

Related U.S. Application Data

[63] Continuation of Ser. No. 106,777, Oct. 13, 1987, abandoned.

[30] Foreign Application Priority Data

Oct. 14, 1986 [AU] Australia .............................. PH08485

[51] Int. Cl.$^4$ .............................................. F02F 3/26
[52] U.S. Cl. ...................... 123/276; 239/453
[58] Field of Search .................. 123/276, 276 E, 261, 123/262, 472; 239/453, 86, 455, 584, 533.7, 600

[56] References Cited

U.S. PATENT DOCUMENTS

| | | | |
|---|---|---|---|
| 2,433,985 | 1/1948 | Fodor | 239/453 |
| 3,156,414 | 11/1964 | Dressler | 239/453 |
| 3,504,681 | 4/1970 | Winkler | 123/276 |
| 3,954,089 | 5/1976 | Harderly et al. | 123/276 |
| 3,999,532 | 12/1976 | Kornhauser | 123/276 |
| 4,164,913 | 8/1979 | Kouniyama et al. | 123/276 |
| 4,177,769 | 12/1979 | Okada et al. | 123/276 |
| 4,417,447 | 11/1983 | Thomas | 123/276 |
| 4,446,830 | 5/1984 | Simko et al. | 123/276 |
| 4,633,830 | 1/1987 | Oshima et al. | 123/276 |
| 4,712,525 | 12/1987 | Ishida | 123/276 |

*Primary Examiner*—Raymond A. Nelli
*Attorney, Agent, or Firm*—Armstrong, Nikaido, Marmelstein, Kubovcik & Murray

[57] ABSTRACT

Improvements in fuel injection nozzles for spark ignited internal combustion engines enabling a metered quantity of fuel entrained in a gas to be delivered into a combustion chamber to optimize the efficiency of operation of the engine. The fuel injection nozzle has a port (11) and a valve (15) movable relative to the port (11). Port (11) and the valve (15) have respective annular sealing faces (13) and (18) defining an annular frusto-conical shaped throat (25) when the nozzle is open for the flow of metered fuel therethrough. The nozzle has a shroud (20) extending from the port (11) surrounding the periphery of the valve (15) when the nozzle is open and defining a delivery passage 27 downstream of the throat in the direction of fuel flow towards the combustion chamber. The delivery passage 27 is configured to be purged of fuel after each fuel delivery cycle to prevent carbon build-up in the nozzle.

16 Claims, 2 Drawing Sheets

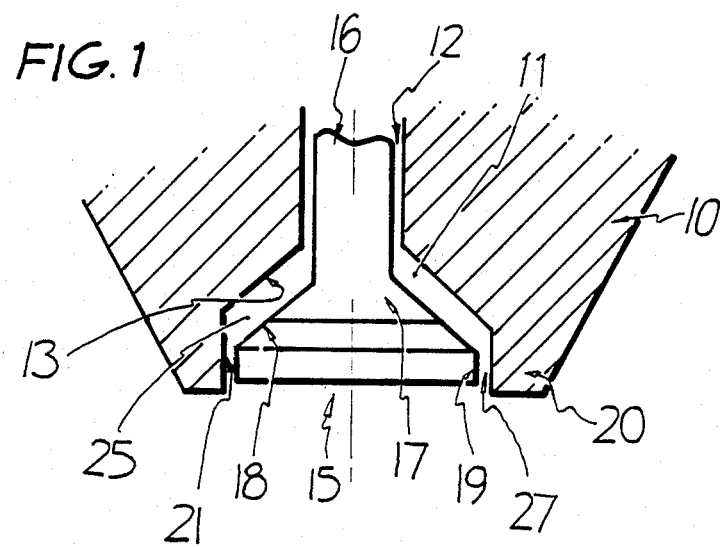
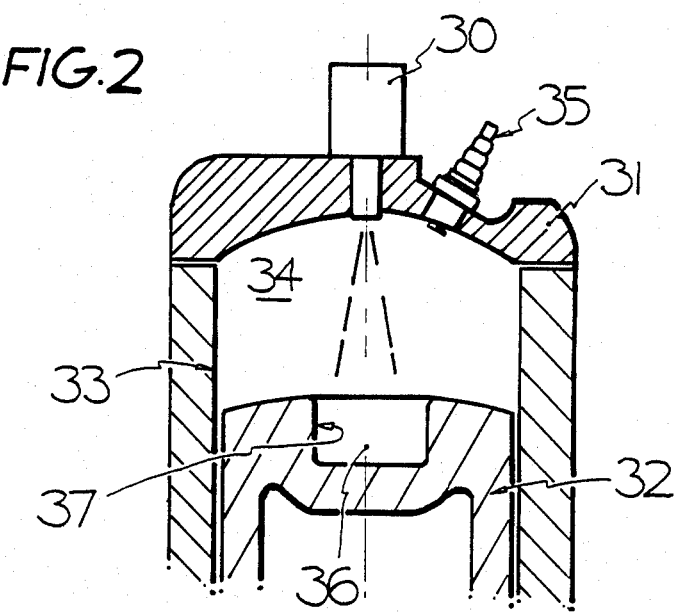

DIRECT FUEL INJECTION

This application is a continuation of application Ser. No. 106,777 filed Oct. 13, 1987 now abandoned.

This invention is directed to fuel injection systems for internal combustion engines of the type wherein the fuel is injected directly into the combustion chamber by means of a gas propellant. The invention has particular applicablity to spark ignited engines operating on either the two stroke or four stroke cycle.

Considerable effort has been expended in developing direct (in-cylinder) injection systems for internal combustion engines. Most of the work has been related to injection of pure liquid diesel fuel in compression ignition engines, but recently spark ignited engines have received more detailed attention.

The present invention is specifically directed to spark ignited internal combustion engines where a pre-metered quantity of fuel is entrained in a gas, conveniently air, and the fuel entrained in the gas is delivered directly into the combustion chamber of the engine through a selectively openable nozzle. In order to fully understand the present invention it must be recognised that the performance of a nozzle differs substantially when used to deliver a liquid fuel entrained in a gas compared with delivering liquid fuel alone.

In the injecting of liquid fuel alone the shape of the fluid spray is controlled by the mechanical detail of the nozzle at the point of exit of the fuel from the nozzle. The pressure drop experienced by the liquid fuel at delivery does not result in any substantial expansion of the liquid fuel and so the liquid fuel continues on the trajectory imparted to it upon exit from the nozzle. Also the atomisation of a liquid fuel is heavily dependent on the thickness of the liquid fuel film passing through the relatively narrow passage provided between mechanical components of the nozzle exit.

In comparison when fuel is entrained in a gas, the gas is subject to a substantial expansion upon exit from a nozzle, and this expansion is dominant in determining the shape of the fuel spray. Accordingly, in order to control the shape of the fuel spray, where the fuel is entrained in a gas, requires different considerations to those where liquid fuel alone is being delivered. Further, the atomisation of fuel entrained in a gas is achieved by a shearing of a fuel film, formed on a surface in the nozzle, by the passage of the gas over the fuel film. Thus the dimensional considerations at the fuel path through the nozzle are different to those where fuel alone is being delivered, and dimensional tolerances in a nozzle for use with fuel entrained in gas may be quite generous.

There has been proposed in U.S. Pat. No. 2,433,985 by Fodor, to provide a fuel injector for an engine operating on the diesel cycle wherein the injector valve moves within a cylindrical surround between the closed and open positions. The internal surface of the cylindrical surround is stepped so that during the initial portion of the opening movement of the valve there is provided a very narrow annular passage through which the fuel is delivered and in the fully open position the valve defines a wider annular passage for the delivery of the fuel. This injector nozzle is specifically intended for use with an engine operating on the diesel cycle and wherein the valve is opened and closed in response to variation in the pressure of the liquid fuel supplied to the nozzle.

The provision of a relatively restricted annular passage for the delivery of the fuel during the initial opening movement of the valve is for the purpose of controlling the initiation of combustion within the engine cylinder, such control being more conveniently achieved in a spark ignited engine by appropriate timing of the actuation of the spark device. Further, the restricted flow of fuel through the relatively narrow passage upon initial opening of the valve of the nozzle, will have an effect on the rate of opening of the valve since the force effecting the opening of the valve is derived from the pressure of the fuel upstream of the valve and that pressure will be influenced by the restricted flow of fuel permitted after initial opening of the valve. Accordingly, it will be appreciated from the above comments and from the previous discussion relating to the differences in form of the fuel spray and atomisation process between liquid fuel alone and liquid fuel entrained in a gas, that the disclosure in the Fodor U.S. Patent would not lead to the present invention which is specifically directed to spray formation and atomisation of fuel when entrained in a gas. Further the restricted flow passage proposed by Fodor would be particularly prone to carbon build-up and detrimental to maintaining the required spray formation and fuel atomisation as required in a spark ignited engine.

A further form of fuel injector nozzle is proposed in U.S. Pat. No. 3,156,414 by Dressler, wherein the valve of the nozzle is again opened in response to the pressure of the liquid fuel supply, and the injector nozzle disclosed is not intended to be used where the fuel is entrained in a body of gas such as air. The invention is specifically directed to constructing the nozzle in the area immediately upstream of the valve so as to collapse any bubbles that exist in the liquid fuel prior to it passing through the valve for delivery to the engine. As this disclosure is directed to a nozzle for use with liquid fuel alone, and wherein the valve is opened in response to the pressure of that liquid, it is clear from the previous discussion and comments that the teachings of the Dressler specification could not be directly applied to an injector nozzle for delivering fuel entrained in gas to the combustion chamber of an engine. Further in a fuel injection system where the fuel is entrained in a gas the problem of excluding bubbles from the fuel as presented by Dressler does not exist.

The characteristics of the spray of fuel droplets issuing from a nozzle into a combustion chamber of a spark ignited engine, have major effects on the efficiency of the burning of the fuel, which in turn affects the stability of the operation of the engine, the fuel efficiency, and the level of exhaust emissions. To optimise these effects, in a spark ignited engine, the desirable characteristics of the spray pattern of the fuel issuing into the combustion chamber include small fuel droplet size, controlled depth of penetration of the fuel spray into the combustion chamber and, at least at low engine loads, a relatively contained evenly distributed cloud of fuel droplets.

In the control of the undesired components of the engine exhaust it is desirable to control the placement of the fuel within the charge in the combustion chamber to meet a number of parameters. Ideally the fuel should be distributed in the air charge so that the resultant fuel-air mixture is readily ignitable at the spark plug, all the fuel should have access to sufficient air to burn completely, and the flame created by the combustion of the fuel should maintain a sufficient temperature to extend to all the fuel in the combustion chamber before being extinguished. There are other factors that must also be considered, such as temperatures in certain areas of the combustion chamber that may promote detonation, or the formation of undesirable contaminants in the exhaust gas.

In practice a nozzle for delivering fuel into the combustion chamber of a spark ignited engine may be designed to give a selected fuel spray configuration to achieve the desired fuel distribution in the combustion chamber. However, in use the high temperatures experienced by the nozzle, due to exposure to the combustion conditions in the combustion chamber, cause a build-up of carbon on high temperature areas of the nozzle in contact with the fuel being delivered. Once carbon starts to build-up the hot spot created by the carbon promotes further carbon build-up. These carbon build-ups in the path of the fuel being deliverd through the nozzle disturb the fuel flow into the combustion chamber and so the nozzle no longer provides the required fuel spray configuration and fuel distribution in the combustion chamber.

It is the object of the present invention to provide in a fuel injection system for the delivery of gas entrained fuel to a spark ignited engine that will contribute to the attainment of the desired fuel distribution in the engine combustion chamber to obtain effective combustion of the fuel.

With this object in view there is provided a spark ignited internal combustion engine fuel injection system wherein a metered quantity of fuel entrained in a gas is delivered directly to a combustion chamber of the engine through a selectively openable nozzle, said nozzle comprising a nozzle body having an internal cavity wherein the metered quantity of fuel is entrained in the gas, a port in the nozzle body communicating the cavity with an external face of said body which in use is located within the engine combustion chamber, an internal annular seal face located in said port between the cavity and said external face of said body, a valve member having an external annular seal face adapted to normally sealably engage said internal seal face to close said port, means operable to selectively move said valve member relative to the port to a port open position, an annular internal terminal surface in the port extending from said internal seal face to said external face of the body, an annular external terminal surface on the valve member extending from said external seal face and defining with said internal terminal surface in the port when the valve member is in the open position an annular passage having in radial section an included angle between the internal and external terminal surfaces of 0° to 40° and with the internal terminal surface in the radial section inclined to the passage axis at an angle not greater than about 15°, the passage being of maximum width at the external surface of the body.

Preferably the external terminal surface on the valve member is substantially cylindrical, but may be of conical form converging inwardly in the direction of flow through the passage. It will be appreciated that a converging external terminal surface on the valve member has a lesser effect on the cross-sectional area of the passage than a diverging internal terminal surface in the port.

Conveniently if the external terminal surface is of convergent conical form, the included angle thereof is not more than about 20° and preferably about 10°. If the internal terminal surface in the port is divergent in the direction of flow the included angle of the conical form resulting from said divergence is preferably not more than about 20°.

The provision of the passage between the terminal surfaces of the port and valve element as before described provides a relatively high velocity flow of the gas and entrained fuel through the passage. This high velocity flow immediately downstream of the seal faces of the port and valve member, when the port is open, effectively purges the passage of fuel. This clearing of fuel from the passage eliminates the retention of fuel droplets on the surfaces forming the passage that may give rise to a build-up of carbon in the passage. Carbon build-up in the passage would have a substantial effect on the form of the fuel spray pattern issuing from the nozzle, which would be uncontrolled and would adversely effect the fuel distribution within the combustion chamber.

It has been found that if the annular seat face in the port is located to intersect the external face of the body at the end of the nozzle body located within the combustion chamber, a carbon build-up develops at the junction of the port and the external face of the body. This carbon build-up is believed to arise, at least in part, from the rapid expansion of the gas upon leaving the annular orifice formed by the open port, and the resultant relatively low gas velocity permits fuel droplets to be deposited at the mouth of the orifice. These fuel droplets burn to form a carbon deposit that disturbs the spray formation and fuel distribution in the combustion chamber.

The provision of the passage as previously described downstream of the seal faces on the port and valve member, in combination with a fuel injection system wherein the fuel is entrained in gas, has the advantage that during the latter portion of the period that the nozzle port is open there is little fuel in the gas being delivered through the passage. In such a fuel injection system the duration of the period that the port is open is considerably in excess of the period required to deliver the metered quantity of fuel required by the engine. Thus the substantially fuel free gas flow through the passage during the latter portion of the port open period will scour out of the passage any fuel droplets clinging to the walls thereof, so those fuel droplets cannot burn while in the passage and create a carbon build-up.

It is also to be understood that in order to achieve effective operation and durability of the valve member that opens and closes the port there are preferred lower limits as to the inclination of the respective seal faces on the port and valve member to the direction of movement of the valve. In the absence of the passage downstream of the seal faces the inclination of these seal faces determines the direction in which the fuel issues therefrom and hence has a substantial influence on the fuel distribution in the combustion chamber. However it is preferable that the fuel is delivered in a spray form having a small included angle to provide a restricted lateral distribution of the fuel as it is delivered into the combustion chamber.

In one preferred construction, the internal and external terminal surfaces of the port and valve member are each cylindrical and co-axial with the axis of the port and valve member. Accordingly, the cross-sectional area of the passage formed by these surfaces is constant throughout the opening movement of the valve member in contrast to the progressively increasing area of the throat between the seal faces as the valve member moves to the open position. It will therefore be appreciated that the flow velocity through the passage is subject to less variation throughout the open period of the valve, and has only a low velocity component in the radial direction, each contributing to better control of fuel distribution and to keeping the passage free of carbon build-up.

A small cone angle of the spray issuing from the passage results in a relatively deep penetrating spray, which is particularly beneficial under high load operation when the fuel is required to be dispersed widely within the combustion chamber in order to achieve full combustion of the fuel. However, under low load operation it is desirable to constrain the fuel distribution so that a readily ignitable mixture is located in the vicinity of the point of ignition. This requirement is contributed to by the nozzle having the passage as above discussed and by providing a combustion cavity in the crown of the piston, and directing the spray from the nozzle towards that cavity.

In addition it is desirable to vary the timing of the commencement of injection of the fuel with engine load. Late injection is preferable for low loads so that the piston is closer to the nozzle when injection occurs and so the fuel spray is not widely spread when it reaches the piston and is substantially all contained within the cavity in the piston. Similarly, early injection at high loads permits the spray to spread more before contacting the piston and so a less amount of fuel enters the cavity in the piston. Thus at high loads the fuel spray may penetrate deeper into the engine cylinder to be exposed to more air, and less fuel is concentrated in the piston cavity. The above described fuel distributions relate to the distribution at the time of ignition.

Low and high engine loads are terms relative to each particular engine considered, and will be understood by the skilled person in the art. However, as a general guide, in the context of a two stroke cycle spark ignited engine for modern automotive applications, high loads can be considered as those greater than 75% of the maximum load achievable by the engine at that speed, while low loads are those less than 30% of the maximum load achievable by the engine at that speed.

The invention will be more readily understood from the following description of specific practical arrangements of the nozzle and engine piston as illustrated in the accompanying drawings.

In the drawings:

FIG. 1 is a cross sectional view of part of a fuel injection nozzle, depicting the nozzle port and associated poppet valve and the surrounding shroud.

FIG. 2 is a schematic representation of an engine cylinder and associated piston and a representation of the form of the fuel spray as issuing from an injector nozzle.

Figure 3:
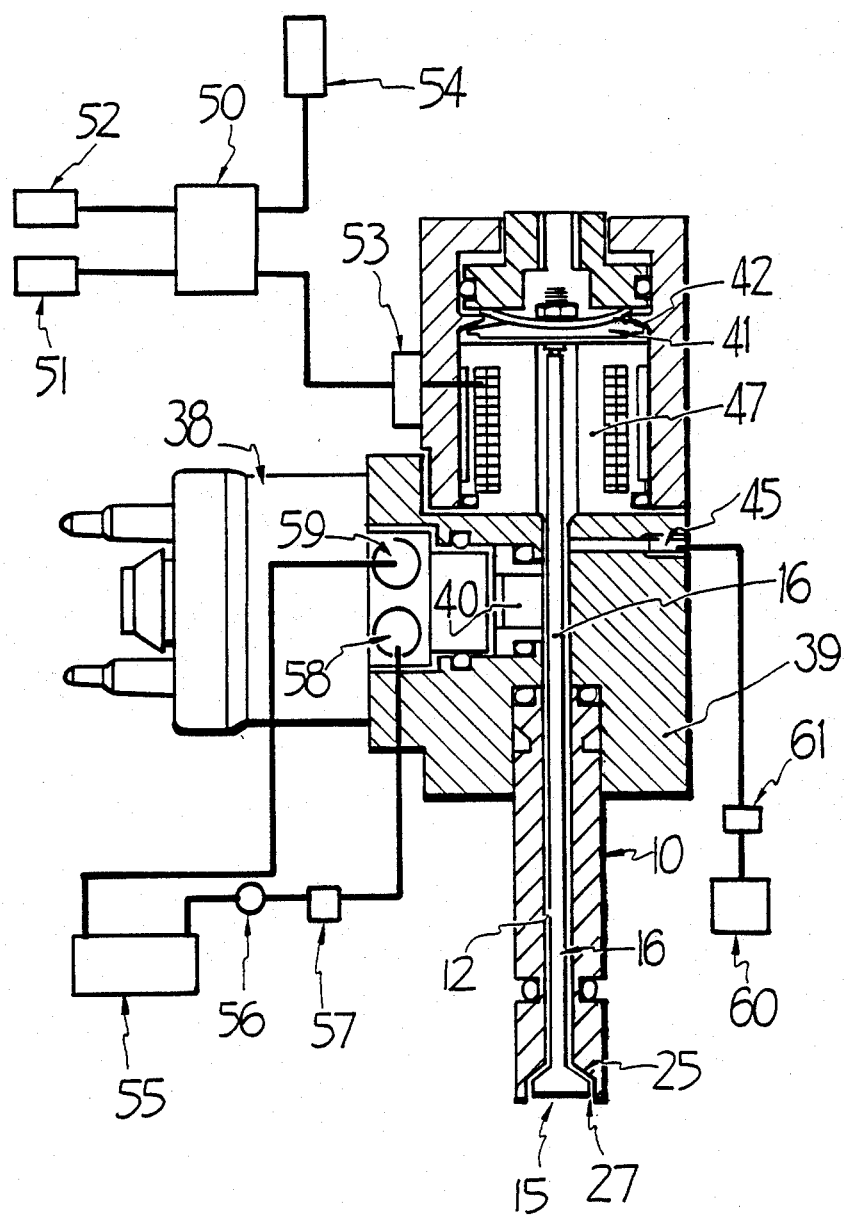
FIG. 3 is a cross sectional view of a solenoid operated fuel injection nozzle enabling a desired variation in timing of fuel delivery.

Referring now to FIG. 1, the nozzle body 10 incorporates the port 11 communicating with an axial cavity 12 through which the fuel and gas is supplied to the port for delivery to the engine. The port 11 comprises a truncated conical seat 13 constituting an annular face with an included angle of 90°. The valve 15 has a stem 16 which is coupled to a suitable actuating mechanism (not shown) and a valve head 17 having a truncated conical seat 18 constituted by an annular face and a cylindrical terminal portion 19. The conical seat 18 has an included angle of 90°, so that the face thereof will mate in sealing relation with the conical seat 13 of the port 11.

Integral with the body 10 in which the port 11 is provided is an extension portion 20 which is co-axial with the valve 15 and presents a cylindrical surface 21 which acts in the manner of a shroud about the valve 15 when the latter is in an open position as shown in the drawing.

In the above construction when the valve is in the open position an annular diverging throat 25 is provided between the opposing conical surfaces of the port 11 and valve 15. A further annular throat or passage 27 is formed between the opposing cylindrical faces of the shroud 20 and the terminal portion 19 of the valve 15. It will be noted that the diametral width of the throat 27 is less than the distance between the conical faces forming the throat 25, measured in the direction normal to said faces.

Referring now to FIG. 2 a fuel injector unit 30 having a nozzle of the construction described with reference to FIG. 1 is fitted to the cylinder head 31 of an engine. The piston 32 reciprocates in the cylinder 33 in the conventional manner to vary the volume of the combustion chamber 34. A conventional spark plug 35 is also provided in the cylinder head.

The piston 32 has a central cavity 36 in the top or crown thereof. The cavity is of circular cross section of a diameter equal to approximately half the diameter of the cylinder 33. The peripheral wall 37 of the cavity is cylindrical and has an axial depth determined by the required compression ratio of the engine. The peripheral wall of the cavity 36 may be of slightly conical form converging towards the base of the cavity. Further, the base of the cavity may be concave with the peripheral wall 37 either cylindrical or conical.

The nozzle of the injector unit 30 and the cavity 36 are both located on the axis of the cylinder, in an opposed relation, so the fuel issuing from the nozzle will be directed towards the cavity 36. If the injection is effected late in the compression stroke of the piston, when the piston is spaced a small distance from the injector nozzle, a substantially large proportion of the fuel injected will be delivered directly into the cavity. Accordingly a rich fuel-air mixture will be established in the cavity 26 so that the mixture is readily ignitable. It is therefore desirable to effect injection late in the compression stroke when the quantity of fuel being injected is small, such as under low load operating conditions. However, under high loads, when the fuel quantity is large, it is desirable to distribute the fuel widely throughout the combustion chamber so the fuel is exposed to sufficient air to achieve complete combustion of all the fuel. Accordingly under high load conditions injection is effected early in the compression stroke when the piston is spaced a greater distance from the injector nozzle so only part of the fuel enters the cavity 36. This achieves a wider distribution of the fuel so as to be exposed to more oxidant gas, such as air, in the combustion chamber to achieve effective combustion of the fuel.

The actual timing of injection to achieve the above discussed effects is dependent on a number of factors and particularly engine speed, injection velocity and included angle of the fuel spray. Accordingly, in practice this timing is required to be individually determined for a particular engine and injector combination.

In a three cylinder two-stroke cycle spark ignited internal combustion engine, with a cylinder piston configuration generally as illustrated in FIG. 2 of the drawings, the cylinder 33 has a diameter of 84 mm and the piston 32 a stroke of 72 mm. The cavity 36 is of cylindrical form having a diameter of 42 mm and a flat bottom spaced axially from the top face of the piston, measured at the axial centre line of the piston, of 16.5 mm.

The injector 30 has a nozzle generally of the configuration as illustrated in FIG. 1 with the valve having at the cylindrical terminal portion 19 a diameter of 4.5 mm, and an axial length of 0.4 mm. The conical seat portion 18 has an included angle of 90°. The conical seal 13 has an included angle of 90°. The internal diameter of extension portion 20 is 4.97 mm.

The axial length of the extension portion 20 is such that when the valve 15 is in the fully open position the extremity of the valve 15 is not below the extremity of the extension portion 20. Conveniently, the projection of the extension portion 20 beyond the valve to 0, the valve diameter.

When the valve 15 is in the open position, the width of the throat 25, measured in a direction normal to the opposed conical surfaces 13 and 18, is 0.247 mm, and the width of the throat 27 is 0.235 mm. As previously stated the width of the throat 25 varies with the degree of opening of the valve 15 and the width of the throat 27 is uniform for all positions of the valve 15. In the engine as above described, fitted with an injector with the nozzle above described, fuel would typically be injected into the combustion chamber to have a velocity of the order of 50 meters/sec at an axial distance of 35 mm from the delivery end of the throat 27. The spray would generally be of a conical shape, diverging from the throat 27, with an included angle of the order of 20°. With this construction of nozzle, and the cavity 36 dimensioned as above stated, the timing of the injection of the fuel would typically be:

Low Load

Injection Commenced 50° BTDC at 740 RPM
Injection Completed 40° BTDC at 740 RPM

High Load

Injection Commenced 240° BTDC at 5000 RPM
Injection Compelted 110° BTDC at 5000 RPM In the above described injector, the throat 27 has parallel cylindrical walls, however, the throat may be with one or both walls of conical form, as previously referred to.

The injection nozzle as disclosed herein may be incorporated in any known form of injector wherein the fuel is mixed with a gas, and the resulting mixture delivered to the combustion chamber. Suitable fuel metering and injector systems are disclosed in our International Patent Application No. PCT/AU86/00205 (WO 87/00580) the disclosure of which is incorporated herein by reference.

As previously stated, increased benefits from the use of the fuel injection system herein described can be obtained by varying the timing of the delivery of the fuel into the combustion chamber to thereby control the proportion of the fuel delivered into the cavity in the piston. A typical construction of a solenoid operated fuel injection nozzle that may be controlled to achieve this variation in fuel delivery timing, and the control system therefor will now be described with reference to FIG. 3 of the accompanying drawings.

The fuel metering and injection unit shown in FIG. 3 incorporates a suitable commercially available metering device 38, such as an automotive type throttle body injector, coupled to an injector body 39 having a holding chamber 40 therein. Fuel is drawn from the fuel reservoir 55 by the fuel pump 56 and delivered via the pressure regulator 57 through fuel inlet port 58 to the metering device 38. The metering device operating in a known manner meters an amount of fuel into the holding chamber 40 in accordance with the engine fuel demand. Excess fuel supplied to the metering device is returned to the fuel reservoir 55 via the fuel return port 59. The particular construction of the fuel metering device 38 is not critical to the present invention and any suitable device may be used.

In operation, the holding chamber 40 is pressurised by air supplied from an air source 60 via pressure regulator 61 and air inlet port 45 in the body 39. Injection valve 15 is actuated to permit the pressurised air to discharge the metered amount of fuel through injector nozzle 10 into the combustion chamber 34 of the engine. Injection valve 15 is of the poppet valve construction (as shown in FIG. 1) opening inwardly to the combustion chamber, that is, outwardly from the holding chamber 40.

The injection valve 15 is coupled, via a valve stem 16, which passes through the holding chamber 40, to the armature 41 of a solenoid 47 located within the injector body 32. The valve 15 is biased to the closed position by the disc spring 42, and is opened by energising the solenoid 47.

Further details of the operation of this fuel injection system are disclosed in Australian patent application No. 32132/84 and the corresponding U.S. Pat. No. 4,693,224, the disclosures of which are incorporated herein by reference.

The energising of the solenoid 47 is timed in relation to the engine cycle by a suitable electronic processor 50. The processor receives an input signal from the speed sensor 51 which signal is indictive of the engine speed and also identifies a reference point in the engine cycle in respect of which operations may be timed in relation to the engine cycle. The processor 50 also receives a signal from the load sensor 52 which signal is indicative of the air flow rate to the engine air induction system. The processor is programmed to determine from the air flow rate signal the load demand on the engine.

The processor 50 is further programmed to determine from the speed and load conditions of the engine the required timing of the injection of the fuel into the combustion chamber.

Conveniently the processor incorporates a multipoint map designating the required injection timing for a range of engine loads and speeds, these having been determined from tests carried out to obtain required engine power and exhaust emission levels. The processor is similarly programmed to determine and control the ignition timing of the engine in relation to engine load and speed.

The processor provides appropriate signals to the injector actuator 53 and ignition actuator 54, in accordance with the determinations, to energise the solenoid 47 at the required time for fuel injection, and activate the spark plug 35 at the required time for ignition. The general construction of the load and speed sensors suitable for use as above indicated are well known in the industry, as are processors for performing the functions required by the processor 50.

The fuel injection system herein disclosed may be used in the delivery of fuel to spark ignited engines operating on either the two stroke cycle or the four stroke cycle. Engines equipped with fuel injection system herein disclosed may be used in any application including engines for vehicles including automobiles, and marine engines including outboard marine engines.

We claim:

1. A spark ignited internal combustion engine fuel injection system wherein a metered quantity of fuel entrained in a gas is delivered directly to a combustion chamber of the engine through a selectively openable nozzle, said nozzle comprising a nozzle body having an internal cavity wherein the metered quantity of fuel is entrained in the gas, a port in the nozzle body communicating the cavity with an external face of said body which in use is located within the engine combustion chamber, an internal annular seal face located in said port between the cavity and said external face of said body, a valve member having an external annular seal face adapted to normally sealably engage said internal seal face to close said port, means operable to selectively move said valve member relative to the port to a port open position, an annular internal terminal surface in the port extending from said internal seal face to said external face of the body, an annular external terminal surface on the valve member extending from said external seal face and defining with said internal terminal surface in the port when the valve member is in the open position an annular passage having in radial section an included angle between the internal and external terminal surfaces of 0° to 40° and with the internal terminal surface in the radial section inclined to the passage axis at an angle not greater than about 15°, the passage being of maximum width at the external surface of the body.

2. A fuel injection system as claimed in claim 1 wherein the external annular terminal surface on the valve member is substantially cylindrical.

3. A fuel injection system as claimed in claim 1 or 2 wherein the internal annular terminal surface in the port is of conical form divergent in the direction of flow through the passage with an included angle of not more than about 20°.

4. A fuel injection system as claimed in claim 1 wherein the external annular terminal surface on the valve member is of conical form convergent in the direction of flow through the passage with an included angle of not more than 10°.

5. An internal combustion engine operating on the two stroke cycle having a fuel injection system as claimed in any one of claims 1 or 2.

6. A fuel injection system as claimed in claim 4 wherein when the valve member is in the port open position, the valve member does not project beyond said external face of the nozzle body.

7. A spark ignited internal combustion engine operating on the two stroke cycle and having a piston reciprocating in an engine cylinder defining a variable volume combustion chamber, and a cavity in said piston forming part of said combustion chamber, said engine having a fuel injection system wherein a metered quantity of fuel entrained in a gas is delivered directly to a combustion chamber of the engine through a selectively openable nozzle, said nozzle comprising a nozzle body having an internal cavity wherein the metered quantity of fuel is entrained in the gas, a port in the nozzle body communicating the cavity with an external face of said body which in use is located within the engine combustion chamber, an internal annular seal face located in said port between the cavity in said external face of said body, a valve member having an external annular seal face adapted to normally sealable engage said internal seal face to close said port, means operable to selectively move said valve member relative to the port to a port open position, an annular internal terminal surface in the port extending from said internal seal face to said external face of the body, an annular external terminal surface on the valve member extending from said external seal face and defining with said internal terminal surface in the port when the valve member is in the open position in an annular passage having in radial section an included angle between the internal and external terminal surface of 0° to 40° and with the internal terminal surface in the radial section inclined to the passage axis at an angle not greater than about 15°, the passage being of maximum width at the external surface of the body, the nozzle located so that at least part of the fuel issuing from the annular passage into the combustion chamber is directed to enter said cavity in the piston.

8. An internal combustion engine as claimed in claim 7, wherein the nozzle is located so that the internal and external annular terminal surfaces are co-axial with the cavity in the piston.

9. An internal combustion engine as claimed in claim 7 or 8, wherein the cavity in the piston is of cylindrical form.

10. An internal combustion engine as claimed in claim 7 or 8, wherein there is provided means to control the timing of the fuel delivery through said nozzle into the combustion chamber in relation to the cylinder cycle, said means being adapted to vary said timing of said fuel delivery in relation to engine load over at least part of the engine load range so that within that engine load range the timing of the fuel delivery is later for low loads than for high loads in said load range, whereby at said low loads a greater proportion of fluid is delivered into said cavity in the piston than at said high loads in said load range each cycle of the engine.

11. An internal combustion engine as claimed in claim 10 wherein the means to control the timing of the fuel delivery is arranged so that the major part of the fuel is delivered into the combustion chamber during said low loads is delivered into said cavity in the piston.

12. An internal combustion engine as claimed in claim 10, wherein the cavity in the piston is of cylindrical form.

13. An internal combustion engine as claimed in claim 7 or 8, wherein the external annular terminal surface on the valve member is of conical form convergent in the direction of flow through the passage with an included angle of not more than 10°.

14. An internal combustion engine having a fuel injection system as claimed in claim 4.

15. The combination claimed in claim 7, wherein the engine is an outboard marine engine operating on the two stroke cycle.

16. The combination claimed in claim 7, wherein the engine is an automobile engine operating on the two stroke cycle.

* * * * *